(12) United States Patent
Zhang et al.

(10) Patent No.: US 11,743,154 B2
(45) Date of Patent: Aug. 29, 2023

(54) METHOD AND APPARATUS FOR PROCESSING NETWORK USAGE OF A CLOUD PRODUCT, DEVICE, STORAGE MEDIUM AND PRODUCT

(71) Applicant: BEIJING BAIDU NETCOM SCIENCE TECHNOLOGY CO., LTD., Beijing (CN)

(72) Inventors: Chengshuo Zhang, Beijing (CN); Yulin Wang, Beijing (CN); Zhi Feng, Beijing (CN)

(73) Assignee: BEIJING BAIDU NETCOM SCIENCE TECHNOLOGY CO., LTD.

( * ) Notice: Subject to any disclaimer, the term of this patent is extended or adjusted under 35 U.S.C. 154(b) by 0 days.

(21) Appl. No.: 17/744,826

(22) Filed: May 16, 2022

(65) Prior Publication Data

US 2022/0278910 A1 Sep. 1, 2022

(30) Foreign Application Priority Data

Jul. 20, 2021 (CN) .......................... 202110821552.9

(51) Int. Cl.
*H04L 12/00* (2006.01)
*H04L 43/062* (2022.01)
(Continued)

(52) U.S. Cl.
CPC ............ *H04L 43/062* (2013.01); *H04L 43/02* (2013.01); *H04L 43/04* (2013.01); *H04L 43/0876* (2013.01)

(58) Field of Classification Search
CPC ....... H04L 43/062; H04L 43/02; H04L 43/04; H04L 43/0876; H04L 41/5019; H04L 67/1012; H04L 67/1074
(Continued)

(56) References Cited

U.S. PATENT DOCUMENTS

| 6,058,260 | A  | * | 5/2000 | Brockel | .............. | H04W 84/042 |
|           |    |   |        |         |                | 703/4       |
| 8,667,171 | B2 | * | 3/2014 | Guo     | ........................ | H04L 45/76 |
|           |    |   |        |         |                | 709/250     |

(Continued)

FOREIGN PATENT DOCUMENTS

| CN | 1567818  | A | 1/2005 |
| CN | 102034194 | A | 4/2011 |

(Continued)

OTHER PUBLICATIONS

First Office Action in CN Patent Application No. 202110821552.9 dated Apr. 6, 2022.

*Primary Examiner* — Frantz Coby
(74) *Attorney, Agent, or Firm* — Dilworth IP, LLC

(57) ABSTRACT

A method and apparatus for processing network usage of a cloud product, a device, a storage medium and a product, and relates to cloud computing and big data in data processing. The specific implementation is: acquiring traffic usage data of a target cloud product within a preset time interval; determining an algorithm list corresponding to the target cloud product; and invoking all pre-configured algorithms corresponding to identifiers of all the algorithms according to the algorithm list to perform corresponding data processing operations on the traffic usage data to obtain a target network usage corresponding to the target cloud product.

20 Claims, 5 Drawing Sheets

(51) Int. Cl.
　　　*H04L 43/02*　　　(2022.01)
　　　*H04L 43/04*　　　(2022.01)
　　　*H04L 43/0876*　(2022.01)

(58) Field of Classification Search
　　　USPC .......................................... 709/223–226, 250
　　　See application file for complete search history.

(56) References Cited

U.S. PATENT DOCUMENTS

| | | | |
|---|---|---|---|
| 9,407,557 B2 * | 8/2016 | Wadkins | H04L 41/0893 |
| 9,819,565 B2 * | 11/2017 | Djukic | H04L 43/0876 |
| 10,205,632 B2 * | 2/2019 | Saavedra | H04L 12/2867 |
| 10,230,599 B2 | 3/2019 | Pietrowicz et al. | |
| 10,601,703 B2 * | 3/2020 | Parasmal | H04L 65/80 |
| 10,637,767 B2 * | 4/2020 | Nauck | H04L 41/16 |
| 11,121,962 B2 * | 9/2021 | Michael | H04L 41/0895 |
| 2019/0280963 A1 * | 9/2019 | Michael | H04L 45/125 |

FOREIGN PATENT DOCUMENTS

| | | | | |
|---|---|---|---|---|
| CN | 106228354 A | 12/2016 | | |
| CN | 107360006 A | 11/2017 | | |
| CN | 111062758 A | 4/2020 | | |
| CN | 111367904 A | 7/2020 | | |
| CN | 112202871 A | 1/2021 | | |
| CN | 112785287 A | 5/2021 | | |
| WO | WO-2019120551 A1 * | 6/2019 | ............. | H04L 45/02 |

* cited by examiner

METHOD AND APPARATUS FOR PROCESSING NETWORK USAGE OF A CLOUD PRODUCT, DEVICE, STORAGE MEDIUM AND PRODUCT

CROSS-REFERENCE TO RELATED APPLICATIONS

This application claims priority to Chinese Patent Application No. 202110821552.9, filed on Jul. 20, 2021, which is hereby incorporated by reference in its entirety.

TECHNICAL FIELD

Embodiments of the present disclosure relate to cloud computing and big data in the field of data processing, and in particular, to a method and apparatus for processing network usage of a cloud product, a device, a storage medium, and a product.

BACKGROUND

A cloud product is a virtualization product of cloud functions or infrastructure provided by cloud service providers to users. At present, common cloud products include content delivery networks (CDN), cloud hosts and so on. Users can reduce their own operation and maintenance costs by purchasing cloud products, such as quickly building a portal website. In today's increasingly abundant cloud products, how to calculate the network usage used by users effectively and flexibly is a current problem. The network usage can be bandwidth information, or traffic usage data that meets preset conditions.

In order to realize the calculation of the network usage used by the cloud product, each calculation method needs to realize a whole process of calculation. In related technologies, a hard-coding method is generally used to realize the whole process of calculation of the usage.

However, when the above method is used to calculate the usage, due to the need to perform hard-coding operations on the whole process of calculation, the required coding time is relatively long, human resources are consumed relatively, thus resulting in lower efficiency of the usage calculation of the cloud product.

SUMMARY

The present disclosure provides a method and apparatus for processing network usage of a cloud product, a device, a storage medium, and a product for realizing usage calculation of a cloud product quickly.

According to a first aspect of the present disclosure, a method for processing network usage of a cloud product is provided, including:

acquiring traffic usage data of a target cloud product within a preset time interval;

determining an algorithm list corresponding to the target cloud product, where the algorithm list includes identifiers of all algorithms used to calculate target network usage of the target cloud product; and invoking all pre-configured algorithms corresponding to the identifiers of all the algorithms according to the algorithm list to perform corresponding data processing operations on the traffic usage data to obtain the target network usage corresponding to the target cloud product.

According to a second aspect of the present application, an apparatus for processing network usage of a cloud product, including:

an acquiring module, configured to acquire traffic usage data of a target cloud product within a preset time interval;

a determining module, configured to determine an algorithm list corresponding to the target cloud product, where the algorithm list includes identifiers of all algorithms used to calculate target network usage of the target cloud product; and a processing module, configured to invoke all pre-configured algorithms corresponding to the identifiers of all the algorithms according to the algorithm list to perform corresponding data processing operations on the traffic usage data to obtain the target network usage corresponding to the target cloud product.

According to a third aspect of the present application, an electronic device is provided, including:

at least one processor; and a memory communicatively connected with the at least one processor; where, the memory stores instructions executable by the at least one processor, and the instructions are executed by the at least one processor, to cause the at least one processor to perform the method for processing network usage of a cloud product described in the first aspect.

According to a fourth aspect of the present application, a non-transitory computer-readable storage medium storing thereon computer instructions is provided, where the computer instructions are used to cause a computer to perform the method for processing network usage of a cloud product described in the first aspect.

It should be understood that the content described in this section is not intended to identify key or important features of the embodiments of the present application, nor is it intended to limit the scope of the present application. Other features of the present application will be easily understood through the following description.

BRIEF DESCRIPTION OF DRAWINGS

The accompanying drawings are used to better understand the solutions, and do not limit the present application. In the accompanying drawings.

DESCRIPTION OF EMBODIMENTS

The following describes exemplary embodiments of the present application in combination with the accompanying drawings, in which various details of the embodiments of the present application are included to facilitate understanding, and they shall be considered as merely exemplary. Therefore, those skilled in the art should realize that various changes and modifications can be made to the embodiments described herein without departing from the scope and spirit of the present application. Similarly, for the sake of clarity and conciseness, the description of well-known functions and structures is omitted in the following.

In view of the above technical problem that in the existing usage calculation, due to the fact that the demand for variable usage calculation cannot be met when the usage calculation is implemented in a hard-coding manner, the present disclosure provides a method and apparatus for processing network usage of a cloud product, a device, a storage medium, and a product.

It should be noted that the present disclosure provides a method and apparatus for processing network usage of a cloud product, a device, a storage medium, and a product, which can be used in scenarios where various cloud products are used for usage calculation.

Figure 1:
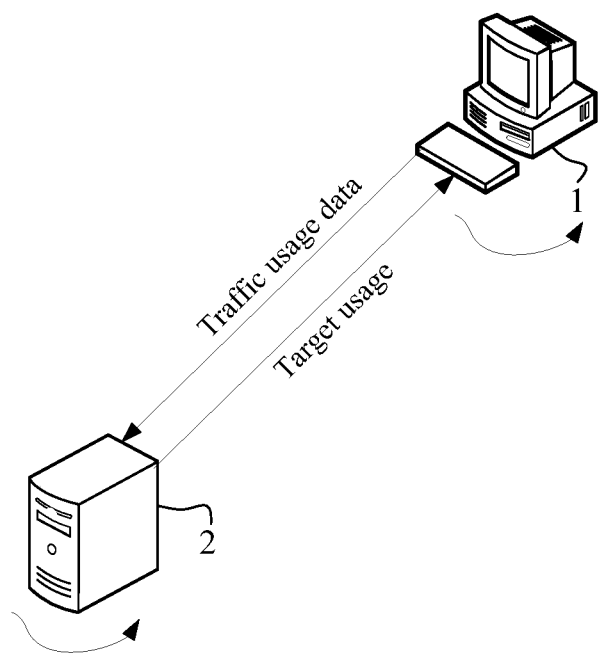
FIG. 1 is a schematic diagram of a system architecture on which the present disclosure is based.

FIG. 1 is a schematic diagram of a system architecture on which the present disclosure is based. As shown in FIG. 1, the system architecture on which the present disclosure is based at least includes: a terminal device 1 and a server 2. Where the server 2 is configured with an apparatus for processing network usage of a cloud product, and the apparatus for processing network usage of a cloud product may be specifically written in languages such as C/C++, Java, Shell, or Python; the terminal device 1 may be, for example, a desktop computer, a tablet computer, etc.

The present disclosure provides a method and apparatus for processing network usage of a cloud product, a device, a storage medium, and a product, which are applied to cloud computing and big data in data processing, so as to achieve an effect of quick usage calculation of a cloud product.

The existing usage calculation of a cloud product generally adopts hard-coding. However, when the algorithm changes or a new calculation method appears in the process of usage calculation of the cloud product, re-coding needs to be performed. As a result, the efficiency of usage calculation is low, and calculation requirements of the changing usage cannot be met.

In the process of solving the above technical problems, the inventor has found through a research that all current algorithms can be pre-configured in order to calculate the usage of the cloud product flexibly. For each target cloud product, an algorithm list corresponding to the target cloud product may be determined, and all pre-configured algorithms corresponding to identifiers of all the algorithms are invoked according to the algorithm list to perform a usage calculation operation for the target cloud product.

Figure 2:
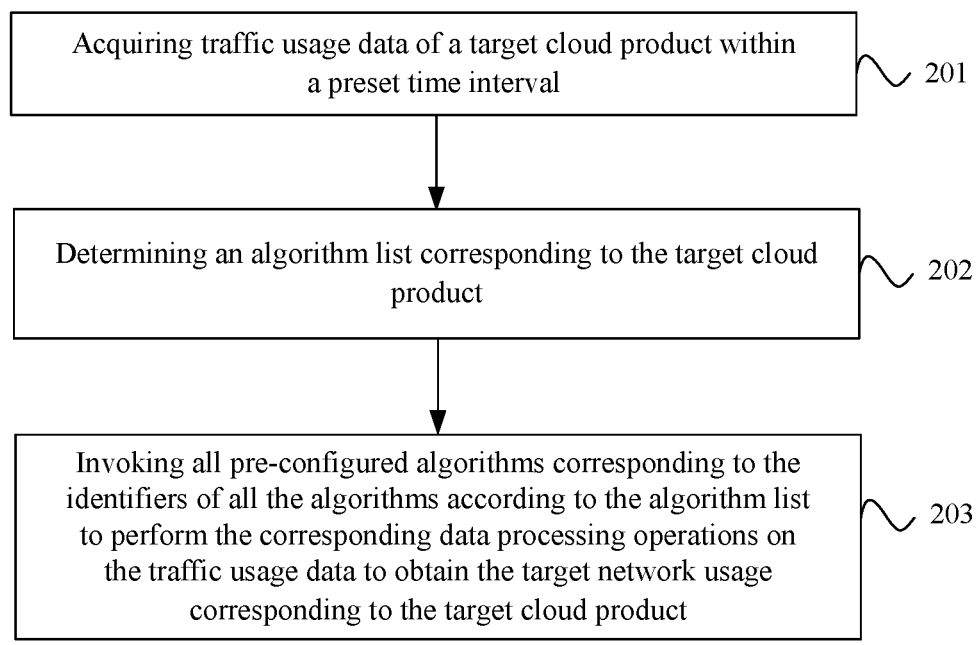
FIG. 2 is a schematic flowchart of a method for processing network usage of a cloud product according to Embodiment 1 of the present disclosure.

FIG. 2 is a schematic flowchart of a method for processing network usage of a cloud product according to Embodiment 1 of the present disclosure. As shown in FIG. 2, the method includes:

S201: acquiring traffic usage data of a target cloud product within a preset time interval.

The execution subject of the embodiment is an apparatus for processing network usage of a cloud product, and the apparatus for processing network usage of a cloud product may be coupled to a server. The server is communicatively connected to a terminal device, so that data communication with the terminal device may be performed.

In the embodiment, the cloud product may be any one of virtualization products of cloud functions or infrastructure provided by cloud service providers to users, for example, it may be application software installed in the terminal device and so on. The apparatus for processing network usage of a cloud product may perform a usage calculation operation on any target cloud product. Specifically, first the apparatus for processing network usage of the cloud product may acquire the traffic usage data of the target cloud product within the preset time interval. The traffic usage data may specifically be a traffic value generated in the process of using the target cloud product by the user per minute.

Where the preset time interval may be a time interval set by the user, or a system default time interval, for example, the time interval may be one day. The apparatus for processing network usage of a cloud product may calculate target network usage corresponding to the target cloud product every day, and perform subsequent processing on the target network usage.

S202: determining an algorithm list corresponding to the target cloud product, where the algorithm list includes identifiers of all algorithms used to calculate target network usage of the target cloud product.

In the embodiment, each target cloud product may correspond to several different calculation methods, therefore, an algorithm list corresponding to the target cloud product may be determined. The algorithm list includes identifiers of all algorithms used to calculate target network usage of the target cloud product.

Specifically, the algorithms used to calculate the target network usage of the target cloud product specifically include:

1. Bandwidth algorithm, which may specifically convert the traffic usage data into a bandwidth value of a preset time period, and the input is the traffic usage data, and the output is the bandwidth value; it may convert bytes into bits, and divide the bits by the preset time period to obtain the bandwidth value, in bps;

2. Average algorithm, which may calculate an average value according to the amount of input traffic usage data and output the same;

3. Top N algorithm, which may select the Nth largest value among multiple pieces of input traffic usage data and output the same;

4. Percentage algorithm, which may specifically select the Nth largest percentage value in the input traffic usage data and output the same;

5. Summation algorithm, which may sum the input traffic usage data and output the same;

6. Maximum value algorithm, which may determine the maximum value in the input traffic usage data and output the same; and 7. The minimum value algorithm, which may determine the minimum value in the input traffic usage data and output the same.

S203: invoking all pre-configured algorithms corresponding to the identifiers of all the algorithms according to the algorithm list to perform corresponding data processing operations on the traffic usage data to obtain the target network usage corresponding to the target cloud product.

In the embodiment, in order to enable the apparatus for processing network usage of a cloud product to process various cloud products and different algorithms in a compatible manner flexibly, the existing process of usage calculation of a cloud product and the calculation methods that are expected to be used in the future development in advance can be summarized and abstracted, and the various algorithms mentioned above can be pre-configured. After the algorithm list is acquired, all pre-configured algorithms corresponding to the identifiers of all algorithms are invoked directly to perform the corresponding data processing operations on the traffic usage data to obtain the target network usage corresponding to the target cloud product.

In an implementation, after obtaining the target network usage corresponding to the target cloud product through calculation, the target network usage may be sent to the terminal device for display in order to make the user know the target network usage more intuitively.

In an implementation, on the basis of any one of the above embodiments, after step 203, the method also includes:

calculating billing data corresponding to the target cloud product according to the target network usage and the preset time interval.

In the embodiment, after obtaining the target network usage through calculation, a fee calculation operation may be further performed according to the target network usage. Specifically, according to the target network usage and the preset time interval, the product of the target network usage and the preset time interval may be used as the billing data corresponding to the target cloud product. Therefore, the calculation of the billing data may be implemented quickly. In addition, the billing data and the target network usage may also be sent to the terminal device for display, so that the user may know the usage and the billing data more intuitively.

According to the method for processing network usage of a cloud product provided in the embodiment, algorithms corresponding to the target cloud product may be used quickly according to different target cloud products to calculate the target network usage. Since all the algorithms currently used to calculate the target network usage of the target cloud product are pre-configured, the algorithm may be invoked directly according to the identifier of the algorithm in the algorithm list without the hard-coding operations, thereby saving human resources and improving the efficiency of calculating the target network usage.

In an implementation, on the basis of Embodiment 1, step 203 specifically includes:

inputting the traffic usage data into calculating units integrated with algorithms for calculating the target network usage of the target cloud product, so that the calculating unit performs the corresponding data processing operations on the traffic usage data to obtain the target network usage corresponding to the target cloud product;

where the calculating units correspond to the algorithms in the algorithm list one by one.

In the embodiment, the above algorithms may be integrated into the calculating units which exist in the system as usage operators, and the usage operators may be combined to implement a series of calculation methods. The calculating unit is the smallest unit of calculation, and may specifically be composed of an input part, an output part and a calculation part. Therefore, after the algorithm list is determined, the calculating units corresponding to all the algorithms in the algorithm list may be invoked to perform data processing operations.

Specifically, the traffic usage data may be input into each calculating unit integrated with an algorithm, and the calculating unit performs data processing operations on the traffic usage data to obtain the target network usage corresponding to the target cloud product.

Figure 3:
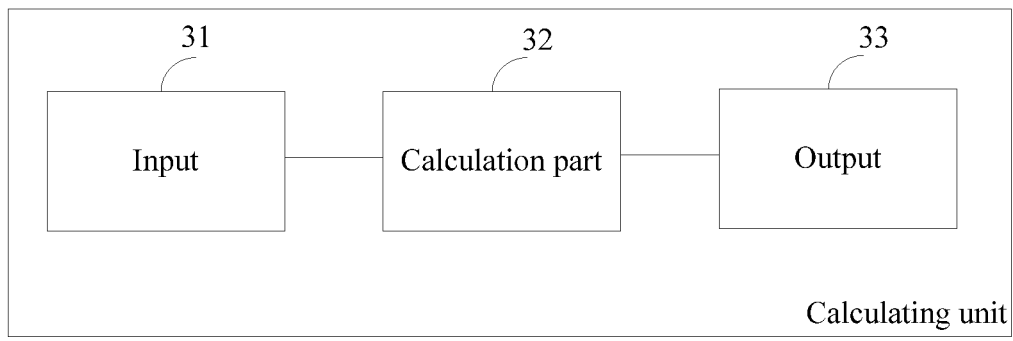
FIG. 3 is a schematic structural diagram of a calculating unit provided by an embodiment of the present disclosure.

FIG. 3 is a schematic structural diagram of a calculating unit provided by an embodiment of the present disclosure. As shown in FIG. 3, the calculating unit may specifically include an input 31, a calculation part 32 and an output 33. Therefore, the traffic usage data may be output and transmitted through the input 31, the calculation part 32 may be configured to calculate the traffic usage data, and the target network usage may be output through the output 33.

In the method for processing network usage of a cloud product provided in the embodiment, by preconfiguring the calculating units integrated with the algorithms, when the algorithm list corresponding to the target cloud product is changed, the calculating units may be invoked flexibly to calculate the target network usage without perform hard-coding again, which improves the efficiency of calculating the target network usage and is suitable for more usage calculation scenarios.

In an implementation, on the basis of Embodiment 1, all algorithms in the algorithm list have a preset processing logic sequence.

Step 203 may further include:

inputting the traffic usage data into a first algorithm calculating unit in the algorithm list according to the processing logic sequence, and acquiring a first intermediate result output by the first algorithm calculating unit;

inputting the first intermediate result into a next calculating unit which is after the first algorithm calculating unit in the processing logic sequence for data processing, and acquiring a second intermediate result output by the next calculating unit;

judging whether the next calculating unit is a last calculating unit in the algorithm list, and if so, determining the second intermediate result as the target network usage corresponding to the target cloud product; and if not, determining the next calculating unit as the current first algorithm calculating unit, and return to the step of inputting the traffic usage data into the first algorithm calculating unit in the algorithm list according to the processing logic sequence, and acquiring the first intermediate result output by the first algorithm calculating unit.

In the embodiment, the preset processing logic sequence may be determined and set by the operation and maintenance personnel according to actual needs, for example, a mutually exclusive logic relationship in the actual application of each algorithm calculating unit may be considered. Correspondingly, after acquiring the algorithm list, the apparatus for processing network usage of the cloud product may acquire the processing logic sequence preset by the operation and maintenance personnel, determine a sequence of algorithm calculating units corresponding to the identifiers of all the algorithm in the algorithm list according to the processing logic sequence, and input the traffic usage data into the first algorithm calculating unit, and use the output data of the previous algorithm calculating unit as the input data of the next algorithm calculating unit.

The mutually exclusive logical relationship of the algorithm calculating units will be explained in combination with practical applications, where the maximum value algorithm calculating unit is configured to determine the maximum value in the input traffic usage data and output the same, and the average algorithm calculating unit is configured to calculate and output the average according to the amount of the input traffic usage data. If the maximum value algorithm calculating unit is arranged before the average algorithm calculating unit, and the output data of the maximum value algorithm calculating unit is input into the average algorithm calculating unit, the value output by the average algorithm calculating unit and the value output by the maximum value algorithm calculating unit output value are the same, rendering the accuracy of the final target network usage not high. Therefore, the research and development personnel may set the processing logic sequence among the algorithm calculating units according to the mutually exclusive logical relationship in the actual data processing process.

Specifically, after acquiring the algorithm list, the apparatus for processing network usage of the cloud product may first input the traffic usage data into the first algorithm calculating unit in the algorithm list according to the processing logic sequence, acquire the first intermediate result output by the first algorithm calculating unit, and use the first intermediate result as the input of the next algorithm calculating unit; then input the first intermediate result into the next calculating unit which is after the first algorithm calculating unit in the processing logic sequence for data processing to acquire the second intermediate result; detect whether the next calculating unit is the last calculating unit in the algorithm list, and if so, it indicates that the calculation of the target network usage of the target cloud product has been completed. On the contrary, it indicates that the data processing for the second intermediate result needs to continue. At present, the apparatus for processing network usage of the cloud product determines the next calculating unit as the current first algorithm calculating unit, and return to the step of inputting the traffic usage data into the first algorithm calculating unit in the algorithm list according to the processing logic sequence, and acquiring the first intermediate result output by the first algorithm calculating unit, until there is no other calculating unit after the next calculating unit; and determine the second intermediate result output by the next calculating unit as the target network usage corresponding to the target cloud product.

Taking a practical application as an example, the target network usage may be the top 5% of peak bandwidths of the target cloud product per month. The bandwidth algorithm calculating unit, the average algorithm calculating unit and the percentage algorithm calculating unit need to be invoked respectively to perform the data processing on the traffic usage data. According to the preset processing logic sequence, it is necessary to first calculate bandwidth points of the target cloud product by using the bandwidth algorithm calculating unit; and then use the average algorithm calculating unit to calculate an average bandwidth point of the target cloud product within the preset time period according to the bandwidth points; and after obtaining multiple average bandwidth points, use the percentage algorithm calculating unit to calculate the top 5% average bandwidth points among the multiple average bandwidth points, to obtain the final output result. Specifically, after the traffic usage data is obtained, the traffic used by the user per minute may be converted into a bit value first, and the traffic in the preset time period is summed to obtain the sum of the traffic in the preset time period. The average bandwidth point of the target cloud product within the preset time period is calculated according to the traffic and the number of seconds included in the preset time period. The above method is executed cyclically to determine multiple average bandwidth points within a month of the target cloud product, the multiple average bandwidth points are sorted in a descending order, and the top 5% of the average bandwidth points are selected as the output.

Figure 4:
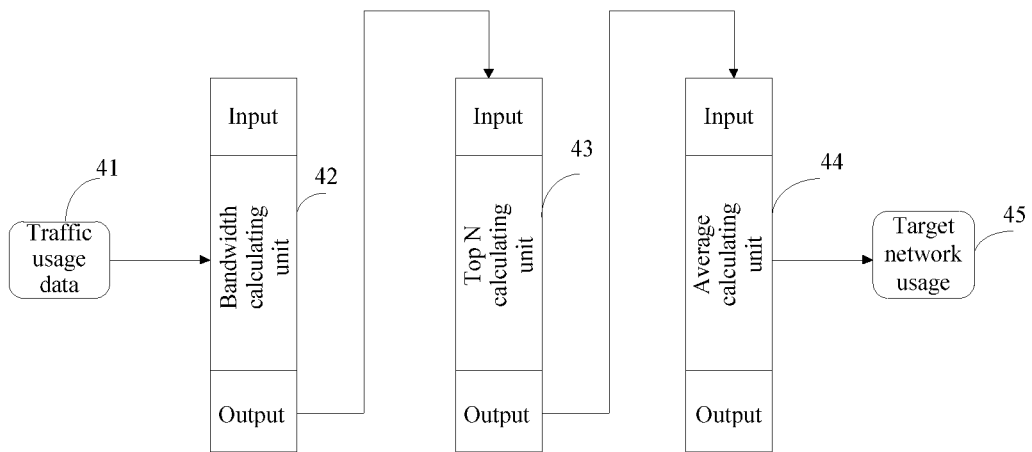
FIG. 4 is a schematic diagram of an application scenario provided by an embodiment of the present disclosure.

FIG. 4 is a schematic diagram of an application scenario provided by an embodiment of the present disclosure. As shown in FIG. 4, traffic usage data 41 may be input into a bandwidth calculating unit 42, intermediate data output by the bandwidth calculating unit 42 may be acquired. The intermediate data may be input into a Top N calculating unit 43, and the intermediate data output by the Top N calculating unit 43 may be acquired and input into an average calculating unit 44 to obtain target network usage 45 output by the average value calculating unit 44.

In an implementation, step 103 may further include:

setting different weights for the algorithms according to actual needs. After the algorithm list is acquired, the traffic usage data may be input into all algorithm calculating units corresponding to the identifiers of all the algorithms in the algorithm list respectively, and the intermediate results output by the algorithm calculating units are obtained. Weighted calculation is performed on the intermediate results output by the algorithm calculating units according to the weights corresponding to the algorithms to obtain the target network usage.

According to the method for processing network usage of a cloud product provided in the embodiment, the target network usage corresponding to the target cloud product may be calculated accurately by processing the traffic usage data according to the processing logic sequence.

In an implementation, on the basis of any one of the above embodiments, step 201 specifically includes:

acquiring the traffic usage data of the target cloud product within the preset time interval according to a preset time period.

In the embodiment, in order to enable the user to know the usage and billing of the target cloud product within a certain period, the traffic usage data may be acquired periodically for data processing to determine the target network usage. Specifically, the traffic usage data of the target cloud product within the preset time interval may be acquired according to the preset time interval. The preset time interval may be a time interval set by the user, or a system default time interval, for example, the time interval may be one day.

In an implementation, on the basis of any one of the above embodiments, step 201 specifically includes:

acquiring a query instruction sent by a terminal device, where the query instruction includes an identifier of the target cloud product; and acquiring the traffic usage data of the target cloud product within the preset time interval according to the identifier of the target cloud product.

In an implementation, the apparatus for processing network usage of a cloud product may further acquire the traffic usage data according to a query instruction triggered by a user. Specifically, the query instruction sent by the terminal device may be acquired, where the query instruction includes the identifier of the target cloud product. The traffic usage data of the target cloud product within the preset time interval may be acquired according to the identifier of the target cloud product. Therefore, the usage and billing of the target cloud product within the preset time interval may be calculated quickly according to the actual needs of the user.

In the method for processing network usage of a cloud product provided in the embodiment, by acquiring the traffic usage data of the target cloud product within the preset time interval regularly, or acquiring the traffic usage data according to the query instruction triggered by the user, thus enabling the users know the usage and billing of the target cloud product on time, so as to improve the user experience.

In an implementation, on the basis of any one of the above embodiments, step 201 specifically includes:

sending an authorization request to a terminal device, where the authorization request includes an identifier of the target cloud product; and acquiring the traffic usage data of the target cloud product within the preset time interval after acquiring an authorization instruction sent by the terminal device.

In the embodiment, before acquiring the traffic usage data of the target cloud product within the preset time interval, it is also necessary to acquire a user's access authorization for the traffic. Specifically, an authorization request may be sent to the terminal device, where the authorization request includes the identifier of the target cloud product. After an authorization instruction sent by the terminal device is acquired, the traffic usage data is acquired. Therefore, the privacy data of the user may be further protected, and the user experience may be improved.

Figure 5:
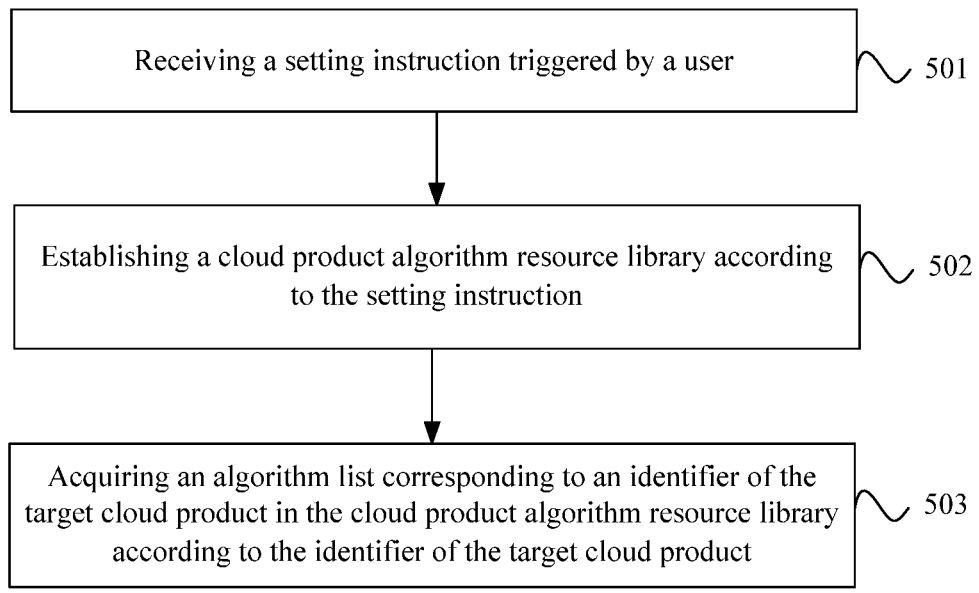
FIG. 5 is a schematic flowchart of a method for processing network usage of a cloud product according to Embodiment 2 of the present disclosure.

FIG. 5 is a schematic flowchart of a method for processing network usage of a cloud product according to Embodiment 2 of the present disclosure. On the basis of Embodiment 1, before step 202, the method further includes:

Step 501: receiving a setting instruction triggered by a user, where the setting instruction is used to instruct to set an identifier of at least one cloud product and an algorithm list corresponding to each cloud product in the at least one cloud product;

Step 502: establishing a cloud product algorithm resource library according to the setting instruction; and Step 503: acquiring an algorithm list corresponding to an identifier of the target cloud product in the cloud product algorithm resource library according to the identifier of the target cloud product.

In the embodiment, the algorithm list corresponding to the target cloud product may be determined according to the actual needs of the user. A cloud product algorithm resource library may be established first in order to acquire the algorithm list quickly, and the cloud product algorithm resource library includes the algorithm list corresponding to each cloud product. Specifically, it may be done in response to a setting instruction triggered by a user, where the setting instruction includes an identifier of at least one cloud product and an algorithm list corresponding to each cloud product.

According to the setting instruction, the identifier of the at least one cloud product and the algorithm list corresponding to each cloud product may be associated and stored to establish the cloud product algorithm resource library.

After the cloud product algorithm resource library is established, specifically, according to the identifier of the target cloud product, the algorithm list corresponding to the identifier of the target cloud product may be acquired in the cloud product algorithm resource library. Therefore, the algorithm list can be acquired quickly, and the efficiency of calculating the network usage of the cloud product can be improved.

The method for processing network usage of a cloud product provided in the embodiment provides a basis for the subsequent acquisition of the algorithm list by establishing the cloud product algorithm resource library, thus improving the efficiency of acquiring the algorithm list, and further improving the efficiency of calculating the network usage of the cloud product.

In an implementation, on the basis of any one of the above embodiments, after step 502, the method further includes:

acquiring an update request sent by a terminal device, where the update request includes an identifier of a cloud product to be updated and an algorithm list to be updated; and updating an algorithm list which is corresponding to the identifier of the cloud product to be updated and stored in the cloud product algorithm resource library to the algorithm list to be updated according to the update request.

In practical applications, the algorithm for the target network usage of the target cloud product may change. Since multiple algorithms are pre-configured, it is only necessary to update the algorithm list corresponding to the target cloud product. Specifically, an update request sent by a terminal device may be acquired, where the update request may include an identifier of the cloud product to be updated and an algorithm list to be updated. According to the identifier of the cloud product to be updated in the update request, the algorithm list corresponding to the identifier of the cloud product to be updated stored in the cloud product algorithm resource library is updated to the algorithm list to be updated. Therefore, when calculating the target network usage of the target cloud product subsequently, the calculation operation of the target network usage may be performed by using the algorithm list to be updated.

Taking a practical application as an example, the current target network usage may be the top 5% peak bandwidths of the target cloud product per month. The bandwidth algorithm calculating unit, the average algorithm calculating unit and the percentage algorithm calculating unit need to be invoked respectively to perform the data processing on the traffic usage data. The updated target network usage may be the average of the top 5% traffic of the target cloud product per month, hence the percentage algorithm calculating unit and the average algorithm calculating unit are required respectively. Therefore, the terminal device may send an update request, where the update request includes an identifier of the target cloud product and an algorithm list to be updated, and the algorithm list to be updated specifically includes an identifier of a percentage algorithm and an identifier of an average algorithm. The apparatus for processing network usage of a cloud product may perform an update operation on the algorithm list corresponding to the identifier of the target cloud product stored in the cloud product algorithm resource library according to the update request. Therefore, in the subsequent calculation of the target network usage, data processing operations may be performed on the traffic usage data according to the updated algorithm list to be updated. In this way, the calculating units may be flexibly invoked, and the calculation of the target network usage does not need to be performed in a hard-coding manner, thus improving the efficiency of calculating the target network usage.

The method for processing network usage of a cloud product provided by the present embodiment is different from the method of using hard-coding for usage calculation in the prior art. By pre-configuring all the algorithms currently used for usage calculation, if the algorithms change during performing usage computation, it is simply necessary to adjust the invoked calculating units according to the changed multiple algorithms without performing hard-coding again, thus realizing quick usage calculation of the target cloud product.

Figure 6:
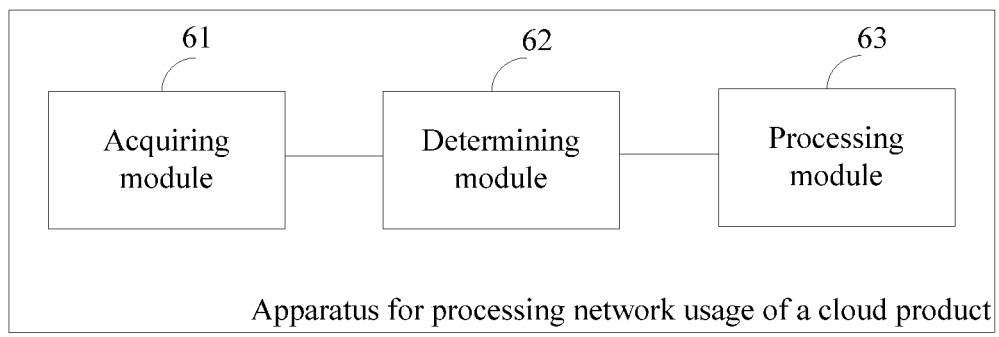
FIG. 6 is a schematic structural diagram of an apparatus for processing network usage of a cloud product provided in Embodiment 3 of the present disclosure.

FIG. 6 is a schematic structural diagram of an apparatus for processing network usage of a cloud product provided in Embodiment 3 of the present disclosure. As shown in FIG. 6, the apparatus includes: an acquiring module 61, a determining module 62 and a processing module 63. Where the acquiring module 61 is configured to acquire traffic usage data of a target cloud product within a preset time interval. The determining module 62 is configured to determine an algorithm list corresponding to the target cloud product, where the algorithm list includes identifiers of all algorithms used to calculate target network usage of the target cloud product. The processing module 63 is configured to invoke all pre-configured algorithms corresponding to the identifiers of all the algorithms according to the algorithm list to perform corresponding data processing operations on the traffic usage data to obtain the target network usage corresponding to the target cloud product.

In an implementation, on the basis of Embodiment 3, the processing module 63 includes: an inputting module, configured to input the traffic usage data into calculating units integrated with algorithms for calculating the target network usage of the target cloud product, so that the calculating unit performs the corresponding data processing operations on the traffic usage data to obtain the target network usage corresponding to the target cloud product; where the calculating units correspond to the algorithms in the algorithm list one by one.

In an implementation, on the basis of Embodiment 3, all the algorithms in the algorithm list have a preset processing logic sequence; where the processing module 63 includes: a first processing unit, configured to input the traffic usage data into a first algorithm calculating unit in the algorithm list according to the processing logic sequence, and acquire a first intermediate result output by the first algorithm calculating unit; a second processing unit, configured to input the first settlement result into a next calculating unit which is after the first algorithm calculating unit in the processing logic sequence for data processing, and acquire a second intermediate result output by the next calculating unit; a judging unit, configured to judge whether the next calculating unit is a last calculating unit in the algorithm list, and if so, determine the second intermediate result as the target network usage corresponding to the target cloud product; if not, determine the next calculating unit as the current first algorithm calculating unit, and return to the step of inputting the traffic usage data into the first algorithm calculating unit in the algorithm list according to the processing logic sequence, and acquiring the first intermediate result output by the first algorithm calculating unit.

In an implementation, on the basis of any one of the above embodiments, the apparatus further includes: a calculating module, configured to calculate billing data corresponding to the target cloud product according to the target network usage and the preset time interval.

In an implementation, on the basis of any one of the above embodiments, the acquiring module includes: a first data acquiring unit, configured to acquire the traffic usage data of the target cloud product within the preset time interval according to a preset time period.

In an implementation, on the basis of any one of the above embodiments, the acquiring module 61 includes: an instruction acquiring unit, configured to acquire a query instruction sent by a terminal device, where the query instruction includes an identifier of the target cloud product; and a second data acquiring unit, configured to acquire the traffic usage data of the target cloud product within the preset time interval according to the identifier of the target cloud product.

In an implementation, on the basis of any one of the above embodiments, the acquiring module 61 includes: a request sending unit, configured to send an authorization request to a terminal device, where the authorization request includes an identifier of the target cloud product; a third data acquiring unit, configured to acquire the traffic usage data of the target cloud product within the preset time interval after acquiring an authorization instruction sent by the terminal device.

In an implementation, on the basis of any one of the above embodiments, the apparatus further includes: a setting instruction receiving module, configured to receive a setting instruction triggered by a user, where the setting instruction is used to instruct to set an identifier of at least one cloud product and an algorithm list corresponding to each cloud product in the at least one cloud product; an establishing module, configured to establish a cloud product algorithm resource library according to the setting instruction; a list acquiring module, configured to acquire an algorithm list corresponding to an identifier of the target cloud product in the cloud product algorithm resource library according to the identifier of the target cloud product.

In an implementation, on the basis of any one of the above embodiments, the apparatus further includes: an update request acquiring module, configured to acquire an update request sent by a terminal device, where the update request includes an identifier of a cloud product to be updated and an algorithm list to be updated; an updating module, configured to update an algorithm list which is corresponding to the identifier of the cloud product to be updated and stored in the cloud product algorithm resource library to the algorithm list to be updated according to the update request.

According to an embodiment of the present disclosure, an electronic device and a computer-readable storage medium are further provided.

According to an embodiment of the present disclosure, a computer program product is further provided, the program product includes: a computer program, the computer program is stored in a readable storage medium, at least one processor of an electronic device may read the computer program from the readable storage medium, and the at least one processor executes the computer program, enabling the electronic device to execute the solution provided by any of the above embodiments.

Figure 7:
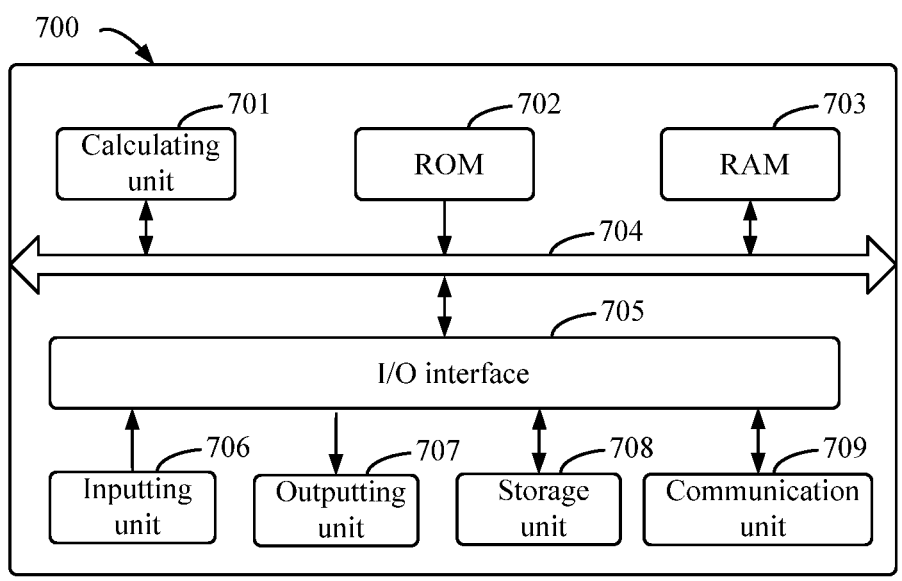
FIG. 7 is a schematic structural diagram of an electronic device according to Embodiment 4 of the present disclosure.

FIG. 7 is a schematic block diagram of an electronic device provided by Embodiment 4 of the present application. The electronic device is intended to represent various forms of digital computers, such as a laptop computer, a desktop computer, a workstation, a personal digital assistant, a server, a blade server, a mainframe computer, and other suitable computers. The electronic device may also represent various forms of mobile apparatuses, such as a personal digital assistant, a cellular phone, a smart phone, a wearable device, and other similar computing apparatuses. Components shown herein, connections and relationships thereof, as well as functions thereof are merely examples and are not intended to limit implementations of the present disclosure described and/or claimed herein.

As shown in FIG. 7, the device 700 includes a calculating unit 701, which can perform various appropriate actions and processing based on a computer program stored in a read only memory (ROM) 702 or a computer program loaded from a storage unit 708 to a random access memory (RAM) 703. In the RAM 703, various programs and data required for the operation of the device 700 can also be stored. The calculating unit 701, the ROM 702, and the RAM 703 are connected to each other through a bus 704. An input/output (I/O) interface 705 is also connected to the bus 704.

Multiple components in the device 700 are connected to the I/O interface 705, including: an inputting unit 706, such as a keyboard, a mouse, etc.; an outputting unit 707, such as various types of displays, speakers, etc.; a storage unit 708, such as a disk, an optical disc, etc.; and a communication unit 709, such as a network card, a modem, a wireless communication transceiver, etc. The communication unit 709 allows the device 700 to exchange information/data with other devices through a computer network such as the Internet and/or various telecommunication networks.

The calculating unit 701 may be various general-purpose and/or special-purpose processing components with processing and computing capabilities. Some examples of the calculating unit 701 include, but are not limited to, a central processing unit (CPU), a graphics processing unit (GPU), various dedicated artificial intelligence (AI) computing chips, various calculating units that run machine learning model algorithms, a digital signal processor (DSP), and any appropriate processor, controller, microcontroller, etc. The calculating unit 701 executes the various methods and processes described above, for example, a method for processing network usage of a cloud product. For example, in some embodiments, the method for processing network usage of a cloud product may be implemented as a computer software program, which is tangibly contained in a machine-readable medium, such as the storage unit 708. In some embodiments, part or all of computer program may be loaded and/or installed on the device 700 via the ROM 702 and/or the communication unit 709. When the computer program is loaded into the RAM 703 and executed by the calculating unit 701, one or more steps of the method for processing network usage of a cloud product described above can be executed. Alternatively, in other embodiments, the calculating unit 701 may be configured to execute the schedule information acquiring method in any other suitable manner (for example, by means of firmware).

The various implementations of the systems and technologies described herein can be implemented in a digital electronic circuit system, an integrated circuit system, a field programmable gate array (FPGA), an application specific integrated circuit (ASIC), an application-specific standard product (ASSP), a system on chip system (SOC), a load programmable logic device (CPLD), a computer hardware, firmware, software, and/or a combination thereof. These various embodiments may include: being implemented in one or more computer programs, the one or more computer programs may be executed and/or interpreted on a programmable system including at least one programmable processor, the programmable processor may be a dedicated or general-purpose programmable processor that can receive data and instructions from a storage system, at least one input device, and at least one output device, and can transmit the data and instructions to the storage system, the at least one input device, and the at least one output device.

The program codes used to implement the method of the present disclosure can be written in any combination of one or more programming languages. These program codes can be provided to the processors or controllers of general-purpose computers, special-purpose computers, or other programmable data processing devices, so that when the program codes are executed by the processors or controllers, the function/operation specified in the flowcharts and/or block diagrams is implemented. The program codes can be executed entirely on the machine, partly executed on the machine, as an independent software package partly executed on the machine and partly executed on the remote machine, or entirely executed on the remote machine or server.

In the context of the present disclosure, a machine-readable medium may be a tangible medium, which may contain or store a program for use by an instruction execution system, apparatus, or device or for use in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the foregoing. More specific examples of machine-readable storage medium may include electrical connections based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the foregoing.

In order to provide interaction with a user, the systems and technologies described herein may be implemented on a computer, where the computer has: a display apparatus (e.g., a CRT (cathode ray tube) or LCD (liquid crystal display) monitor) for displaying information to the user; and a keyboard and a pointing apparatus (e.g, a mouse or a trackball), through which the user can provide inputs to the computer. Other types of apparatuses may also be used to provide interaction with the user; for example, the feedback provided to the user may be any form of sensing feedback (such as, visual feedback, auditory feedback, or tactile feedback); and the input from the user may be received in any form (including acoustic input, voice input, tactile input).

The systems and technologies described here may be implemented in a computing system (e.g., a data server) including a back-end component, or in a computing system (e.g., an application server) including a middleware component, or in a computing system (e.g., a user computer having a graphical user interface or a web browser, through which the user can interact with the implementations of the systems and technologies described herein) including a front-end component, or in a computing system including any combination of the back-end component, the middleware component, or the front-end component. The components of the system may be interconnected via digital data communication (e.g., a communication network) in any form or medium. Examples of the communication network include: a local area network (LAN), a block-chain-based service network (BSN), a wide area network (WAN) and Internet.

A computer system may include a client and a server. The client and the server are generally located far away from each other and usually interact with each other through a communication network. A relationship between the client and the server is generated by computer programs running on corresponding computers and having a client-server relationship between each other. The server can be a cloud server, also known as a cloud computing server or a cloud host. It is a host product in the cloud computing service system to solve the defects about the difficulties in management and weak business scalability in the traditional physical host and virtual private server (VPS) services. The server can also be a server of a distributed system, or a server combined with block chain.

It should be understood that steps can be reordered, added, or deleted by using the various forms of processes shown above. For example, the steps recited in the present application can be performed in parallel, in sequence or in different orders, as long as expected results of the technical solutions disclosed by the present application can be realized, and there is no limitation herein.

The above specific implementations do not limit the protection scope of the present application. It should be understood by those skilled in the art that various modifications, combinations, sub-combinations and substitutions may be made according to design requirements and other factors. Any modification, equivalent replacement and improvement made within the spirit and principle of the present application shall be included in the protection scope of the present application.

What is claimed is:

1. A method for processing network usage of a cloud product, comprising:
   acquiring traffic usage data of a target cloud product within a preset time interval;
   determining an algorithm list corresponding to the target cloud product, wherein the algorithm list comprises identifiers of all algorithms used to calculate target network usage of the target cloud product; and
   invoking all algorithms corresponding to the identifiers of all the algorithms according to the algorithm list to perform corresponding data processing operations on the traffic usage data to obtain the target network usage corresponding to the target cloud product, wherein all the algorithms corresponding to the identifiers of all the algorithms are pre-configured.

2. The method according to claim 1, wherein the invoking all the algorithms corresponding to the identifiers of all the algorithms according to the algorithm list to perform the corresponding data processing operations on the traffic usage data comprises:
   inputting the traffic usage data into calculating units integrated with algorithms for calculating the target network usage of the target cloud product, so that the calculating unit performs the corresponding data processing operations on the traffic usage data to obtain the target network usage corresponding to the target cloud product;
   wherein the calculating units correspond to the algorithms in the algorithm list one by one.

3. The method according to claim 1, wherein all algorithms in the algorithm list have a preset processing logic sequence;
   wherein the invoking all the algorithms corresponding to the identifiers of all the algorithms according to the algorithm list to perform the corresponding data processing operations on the traffic usage data comprises:
   inputting the traffic usage data into a first algorithm calculating unit in the algorithm list according to the processing logic sequence, and acquiring a first intermediate result output by the first algorithm calculating unit;
   inputting the first intermediate result into a next calculating unit which is after the first algorithm calculating unit in the processing logic sequence for data processing, and acquiring a second intermediate result output by the next calculating unit;
   judging whether the next calculating unit is a last calculating unit in the algorithm list, and if so, determining the second intermediate result as the target network usage corresponding to the target cloud product; and
   if not, determining the next calculating unit as the current first algorithm calculating unit, and returning to the step of inputting the traffic usage data into the first algorithm calculating unit in the algorithm list according to the processing logic sequence, and acquiring the first intermediate result output by the first algorithm calculating unit.

4. The method according to claim 2, wherein all algorithms in the algorithm list have a preset processing logic sequence;
   wherein the invoking all the algorithms corresponding to the identifiers of all the algorithms according to the algorithm list to perform the corresponding data processing operations on the traffic usage data comprises:
   inputting the traffic usage data into a first algorithm calculating unit in the algorithm list according to the processing logic sequence, and acquiring a first intermediate result output by the first algorithm calculating unit;
   inputting the first intermediate result into a next calculating unit which is after the first algorithm calculating unit in the processing logic sequence for data processing, and acquiring a second intermediate result output by the next calculating unit;
   judging whether the next calculating unit is a last calculating unit in the algorithm list, and if so, determining the second intermediate result as the target network usage corresponding to the target cloud product; and
   if not, determining the next calculating unit as the current first algorithm calculating unit, and returning to the step of inputting the traffic usage data into the first algorithm calculating unit in the algorithm list according to the processing logic sequence, and acquiring the first intermediate result output by the first algorithm calculating unit.

5. The method according to claim 1, wherein the invoking all the algorithms corresponding to the identifiers of all the algorithms according to the algorithm list to perform the corresponding data processing operations on the traffic usage data to obtain the target network usage corresponding to the target cloud product, the method further comprises:
   calculating billing data corresponding to the target cloud product according to the target network usage and the preset time interval.

6. The method according to claim 2, wherein the invoking all the algorithms corresponding to the identifiers of all the algorithms according to the algorithm list to perform the corresponding data processing operations on the traffic usage data to obtain the target network usage corresponding to the target cloud product, the method further comprises:
   calculating billing data corresponding to the target cloud product according to the target network usage and the preset time interval.

7. The method according to claim 3, wherein the invoking all the algorithms corresponding to the identifiers of all the algorithms according to the algorithm list to perform the corresponding data processing operations on the traffic usage data to obtain the target network usage corresponding to the target cloud product, the method further comprises:
   calculating billing data corresponding to the target cloud product according to the target network usage and the preset time interval.

8. The method according to claim 1, wherein the acquiring the traffic usage data of the target cloud product within the preset time interval comprises:
   acquiring the traffic usage data of the target cloud product within the preset time interval according to a preset time period.

9. The method according to claim 2, wherein the acquiring the traffic usage data of the target cloud product within the preset time interval comprises:
   acquiring the traffic usage data of the target cloud product within the preset time acquiring the traffic usage data of the target cloud product within the preset time interval according to a preset time period.

10. The method according to claim 3, wherein the acquiring the traffic usage data of the target cloud product within the preset time interval comprises:

acquiring the traffic usage data of the target cloud product within the preset time acquiring the traffic usage data of the target cloud product within the preset time interval according to a preset time period.

11. The method according to claim 1, wherein the acquiring the traffic usage data of the target cloud product within the preset time interval comprises:
acquiring a query instruction sent by a terminal device, wherein the query instruction comprises an identifier of the target cloud product; and
acquiring the traffic usage data of the target cloud product within the preset time interval according to the identifier of the target cloud product.

12. The method according to claim 2, wherein the acquiring the traffic usage data of the target cloud product within the preset time interval comprises:
acquiring a query instruction sent by a terminal device, wherein the query instruction comprises an identifier of the target cloud product; and
acquiring the traffic usage data of the target cloud product within the preset time interval according to the identifier of the target cloud product.

13. The method according to claim 3, wherein the acquiring the traffic usage data of the target cloud product within the preset time interval comprises:
acquiring a query instruction sent by a terminal device, wherein the query instruction comprises an identifier of the target cloud product; and
acquiring the traffic usage data of the target cloud product within the preset time interval according to the identifier of the target cloud product.

14. The method according to claim 1, wherein the acquiring the traffic usage data of the target cloud product within the preset time interval comprises:
sending an authorization request to a terminal device, wherein the authorization request comprises an identifier of the target cloud product; and
acquiring the traffic usage data of the target cloud product within the preset time interval after acquiring an authorization instruction sent by the terminal device.

15. The method according to claim 2, wherein the acquiring the traffic usage data of the target cloud product within the preset time interval comprises:
sending an authorization request to a terminal device, wherein the authorization request comprises an identifier of the target cloud product; and
acquiring the traffic usage data of the target cloud product within the preset time interval after acquiring an authorization instruction sent by the terminal device.

16. The method according to claim 3, wherein the acquiring the traffic usage data of the target cloud product within the preset time interval comprises:
sending an authorization request to a terminal device, wherein the authorization request comprises an identifier of the target cloud product; and
acquiring the traffic usage data of the target cloud product within the preset time interval after acquiring an authorization instruction sent by the terminal device.

17. The method according to claim 1, wherein the determining the algorithm list corresponding to the target cloud product comprises:
receiving a setting instruction triggered by a user, wherein the setting instruction is used to instruct to set an identifier of at least one cloud product and an algorithm list corresponding to each cloud product in the at least one cloud product;
establishing a cloud product algorithm resource library according to the setting instruction; and
acquiring an algorithm list corresponding to an identifier of the target cloud product in the cloud product algorithm resource library according to the identifier of the target cloud product.

18. The method according to claim 17, wherein after establishing the cloud product algorithm resource library according to the setting instruction, the method further comprises:
acquiring an update request sent by a terminal device, wherein the update request comprises an identifier of a cloud product to be updated and an algorithm list to be updated; and
updating an algorithm list which is corresponding to the identifier of the cloud product to be updated and stored in the cloud product algorithm resource library to the algorithm list to be updated according to the update request.

19. An apparatus for processing network usage of a cloud product, comprising:
at least one processor; and
a memory communicatively connected to the at least one processor; wherein, the memory stores instructions executable by the at least one processor, and the instructions are executed by the at least one processor, to cause the at least one processor to:
acquire traffic usage data of a target cloud product within a preset time interval;
determine an algorithm list corresponding to the target cloud product, wherein the algorithm list comprises identifiers of all algorithms used to calculate target network usage of the target cloud product; and
invoke all algorithms corresponding to the identifiers of all the algorithms according to the algorithm list to perform corresponding data processing operations on the traffic usage data to obtain the target network usage corresponding to the target cloud product, wherein all the algorithms corresponding to the identifiers of all the algorithms are pre-configured.

20. A non-transitory computer-readable storage medium storing thereon computer instructions, wherein the computer instructions are used to cause a computer to:
acquire traffic usage data of a target cloud product within a preset time interval;
determine an algorithm list corresponding to the target cloud product, wherein the algorithm list comprises identifiers of all algorithms used to calculate target network usage of the target cloud product; and
invoke all algorithms corresponding to the identifiers of all the algorithms according to the algorithm list to perform corresponding data processing operations on the traffic usage data to obtain the target network usage corresponding to the target cloud product, wherein all the algorithms corresponding to the identifiers of all the algorithms are pre-configured.

* * * * *